July 18, 1939.  O. A. LOGAN  2,166,308

FIFTH WHEEL ASSEMBLY

Filed Jan. 10, 1938  3 Sheets-Sheet 1

INVENTOR.
Otis A. Logan
BY Howy Hamilton
ATTORNEYS

July 18, 1939.  O. A. LOGAN  2,166,308

FIFTH WHEEL ASSEMBLY

Filed Jan. 10, 1938  3 Sheets-Sheet 2

INVENTOR.
Otis A. Logan
BY Howys Hamilton
ATTORNEYS

Patented July 18, 1939

2,166,308

UNITED STATES PATENT OFFICE 2,166,308

FIFTH WHEEL ASSEMBLY

Otis A. Logan, Kansas City, Mo.

Application January 10, 1938, Serial No. 184,298

5 Claims. (Cl. 280—33.1)

This invention relates to fifth wheel assemblies in the nature of those employed to couple together the well-known tractor and trailer, and the primary object of this invention is the provision of such an assembly wherein is embodied means for positively maintaining the tractor and trailer plates in operative position so that in event the king pin fails to function for any reason, the means for maintaining the said plates together will preclude accidental displacement and serious damage.

One of the important aims of this invention is to provide a fifth wheel assembly having means for removably securing the king pin in place, such means permitting the replacement of the king pin while the tractor and trailer plates are superimposed in the operative position.

A still further object of the present invention is the provision of a fifth wheel assembly having therein interlocking structure for the tractor and trailer plates thereof, which structure is disposed at the periphery of the trailer plate so as to supplement the king pin that is located on the axis of rotation of the trailer plate.

In this art, it is well-known that the breaking of a king pin commonly employed, will often times present a dangerous situation in that the tractor and trailer plates will then be allowed to slide apart, which results in an uncoupling of the tractor and trailer.

Details of construction, which are made clear in the drawings and will be described in the following specification, exemplify more specific objects of the invention and the preferred embodiment thereof is illustrated in the accompanying drawings wherein.

The fifth wheel assembly embodying the preferred form of this invention is particularly useful in joining together a tractor and a trailer or semi-trailer. In the illustrated exemplification of the invention, a fragment of tractor 12 is shown and a portion of trailer 14 is pictured. The portion of trailer 14 is the floor thereof, and this portion of the floor of trailer 14 has an opening 16 provided therein that is closed by a door 18, through the medium of which opening 16 the operator may gain access to the hereinafter described king pin.

Figure 6:
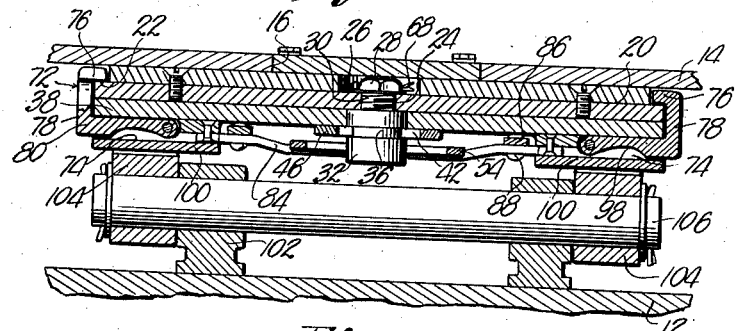
Fig. 6 is a similar vertical cross-sectional view taken on line VI—VI of Fig. 2.

Trailer 14 has affixed thereto a trailer plate 20 made up of two parts, as shown in Fig. 6 so that an annular shoulder 22 is provided at the annular periphery of plate 20. If desired, the two parts, shown in Fig. 6 and which constitute plate 20, may be a single piece with shoulder 22 turned thereon and a central opening 24 provided therethrough at its axis. Opening 24 is off set to provide an enlarged portion at the upper face of plate 20 and to present a shoulder 26 that forms a seat for nut 28. Thus nut 28 is secured to threaded portion 30 of king pin 32 to hold the same in place at the axis of trailer plate 20. Threaded portion 30 of king pin 32 is smaller in diameter than the remaining part thereof, so that an annular shoulder 34 is presented to bear against the lower face of plate 20. Thus, when nut 28 is tightened, the pressure is exerted upon that portion of the plate between shoulder 34 and shoulder 26 to retain pin 32 against displacement.

An annular groove 36 is provided in king pin 32 in the portion thereof extending below the normally lower face of plate 20. The distance of annular groove 36 below the lower face of plate 20 is sufficient to dispose tractor plate 38 above annular groove 36 in order that the pin engaging parts thereon might enter this groove 36.

Figure 3:
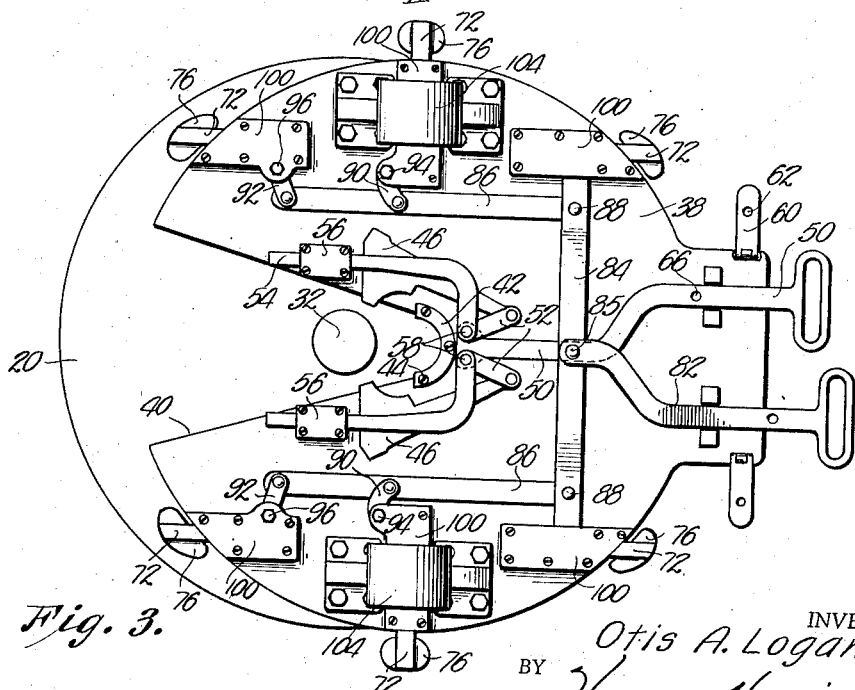
Fig. 3 is a similar view but with the tractor and trailer plates slightly displaced.
Figure 4:
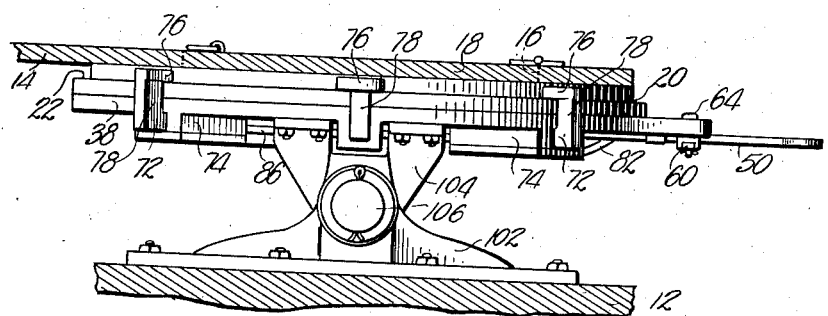
Fig. 4 is an edge elevation of the fifth wheel assembly.
Figure 5:
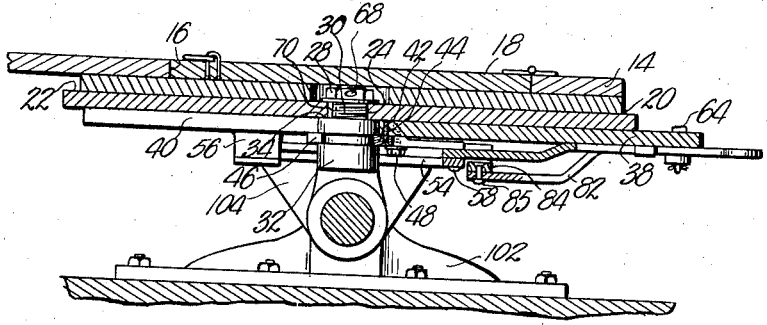
Fig. 5 is a vertical cross-sectional view through the assembly taken on line V—V of Fig. 2.

King pin 32 passes to the axis of tractor plate 38 through the radially disposed slot 40 which flares outwardly as the annular edge of plate 38 is approached, all as illustrated in Fig. 3. A bearing member 42 of hardened material is secured to plate 38 to extend over the inner end of slot 40 and into annular groove 36 when king pin 32 is in the operative position. This bearing member 42 is removably secured to plate 38 by machine bolts or analogous means 44, so that as wear occurs, the member may be renewed.

A pair of locking jaws 46 are pivotally secured to the under face of plate 38 by pivot bolts 48 so that when jaws 46 are moved about these pivot members 48, the arcuate portions thereof enter annular groove 36 of king pin 32. These arcuate portions of jaws 46 are concentric with the axis of king pin 32 when it is in the operative position and cooperate with bearing member 42 in securing this king pin in place in the axis of the superimposed plates 20 and 38 respectively.

Figure 1:
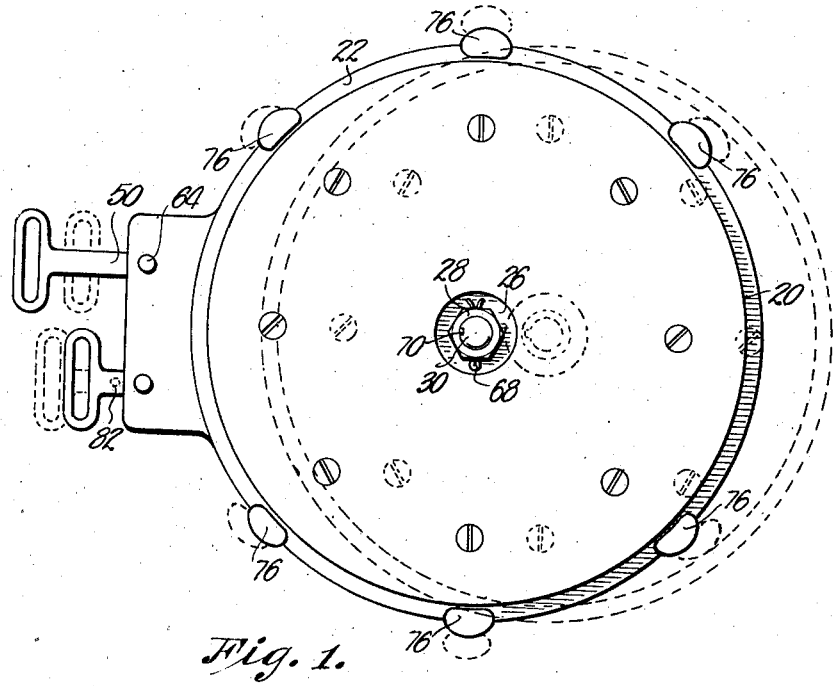
Figure 1 is a top plan view of a fifth wheel assembly showing the same entirely removed from association with the tractor and trailer.
Figure 8:
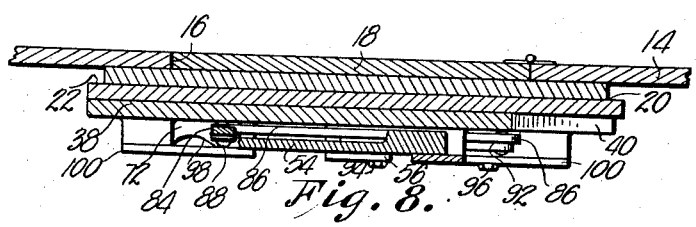
Fig. 8 is a similar view taken on line VIII—VIII of Fig. 2.
Figure 9:
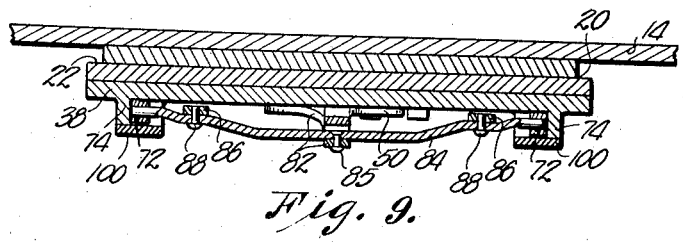
Fig. 9 is a vertical cross-sectional view taken on line IX—IX of Fig. 2.
Figure 2:
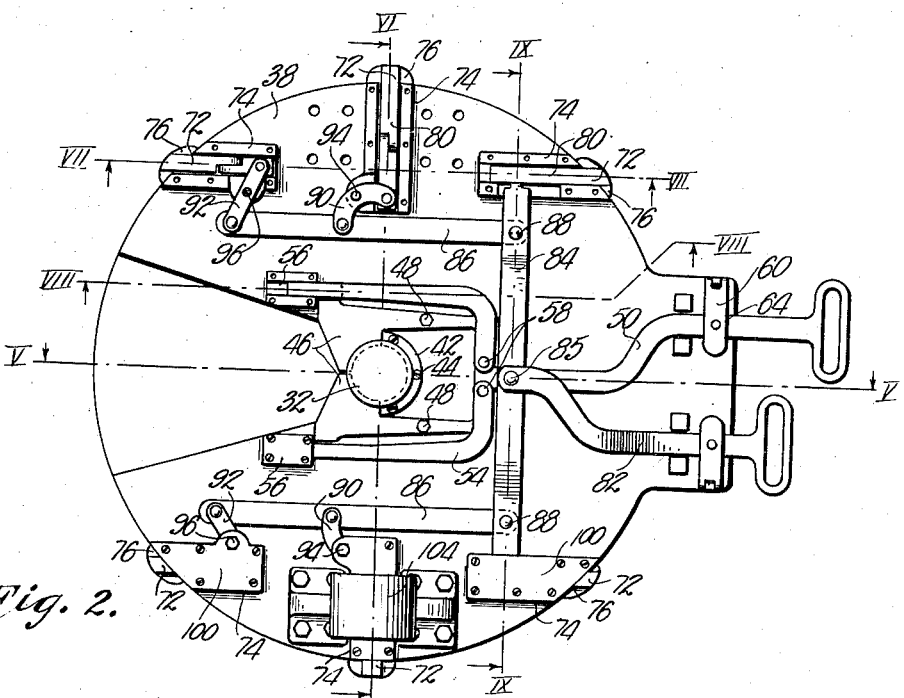
Fig. 2 is an inverted plan view of the said fifth wheel assembly embodying this invention.

The manner of moving jaws 46 to and from the pin engaging position, is clearly shown in Figs. 2 and 3, and this movement is accomplished by manually manipulating outwardly extending handle 50. This handle is joined to the ends of jaws 46 by links 52, and when handle 50 is moved outwardly from the position shown in Fig. 3 to that position shown in Fig. 2, links 52 force jaws 46 about their pivotal connections 48 and into engagement with king pin 32, as illustrated in Fig. 2.

During this movement of jaws 46 from the inoperative to the operative position, with respect to king pin 32, there is an additional action which lock jaws 46 in the closed condition. A lock yoke 54 slidably journalled in bearings 56, is secured to handle 50 as at 58 so that when the handle is moved, the enlarged ends of yoke 54 will be moved behind the outer ends of jaws 46. Thus, jaws 46 are automatically locked in engagement with king pin 32 when handle 50 is operated as above set down.

This handle 50 is provided with a securing means to maintain the same in place after jaws 46 are moved to the operative position. The securing means in this instance is in the nature of a swingable tongue 60 having an opening 62 therein and a pin 64 which passes through opening 62 and opening 66 that is in register with opening 62 when handle 50 is moved outwardly to the end of its stroke. This pin 64 passes through an opening in plate 38 which lies in register with openings 62 and 66 when handle 50 is in the position shown in Fig. 2. If king pin 32 should break, the operator may renew the same by merely lifting door 18 from a point inside trailer 14. Cotter key 68 is then removed, nut 28 taken off of the threaded portion 30 of the pin, and the component parts thereof, formed by any break, driven downwardly and out of opening 24 and slot 40 after jaws 46 have been withdrawn to the position shown in Fig. 3. In order to insure that nut 28 might be turned off of threaded portion 30, a key 70 is employed to lock together portion 30 and plate 20.

The fifth wheel assembly embodying this invention provides means for safeguarding disastrous effects if king pin 32 should break or if any part of the locking mechanism should fail.

A plurality of dogs 72 are slidably mounted in bearings 74 on the underside of plate 38 for the purpose of interconnecting plates 20 and 38 at the annular periphery of the former. These dogs 72 are substantially U-shaped so that there is an overhanging portion 76 to lie upon the upper face of annular shoulder 22. The upwardly extending portions 76 of dogs 72 preclude radial displacement of plate 20 with respect to plate 38 and the legs 80 of dogs 72 are slidably journalled in the aforesaid bearings 74. All of these dogs 72 are simultaneously actuated by the movement of a handle 82, which is similar to handle 50 and located adjacent thereto.

A cross head 84 is in direct connection with handle 82 through the medium of pin 85 and a dog 72 is secured to each end of this cross head 84. Side bars 86 pivotally secured, as at 88 to cross head 84, extend outwardly from cross head 84 and are linked to the adjacent dogs 72 by appropriately constructed links 90 and 92 respectively. These links 90 and 92 are pivotally held in position intermediate their ends as at 94 and 96 respectively, so that longitudinal movement of side bars 86 will longitudinally move dogs 72 which are associated with links 90 and 92. So moving side bars 86 will also longitudinally move dogs 72 which are joined to cross head 84.

Figure 7:
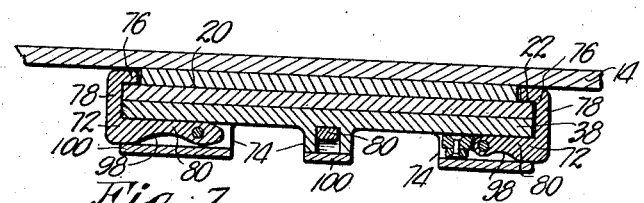
Fig. 7 is a detailed vertical cross-sectional view taken on line VII—VII of Fig. 2.

Certain of dogs 72 are pivotally mounted as shown in Fig. 7 so that when they are moved outwardly and portions 76 thereof are moved away from the upper face of shoulder 22, the entire dogs 72 will move downwardly through the action of gravity to permit clearance and allow the removal of plate 20 from plate 38, when the tractor and trailer are being uncoupled. The dogs must also assume this lowered position when the tractor and trailer are being operatively joined.

Cam faces 98 formed on certain of dogs 72 ride over a guide element 100, which forms a part of the associated bearing 74 so that as dogs 72 are moved to the operative position, they will be lifted and positioned over the top of shoulder 22 on plate 20.

The locking mechanism for handle 82 is a duplicate of the locking mechanism above described, with respect to handle 50 and further description of these parts is unnecessary.

Tractor frame 12 supports tractor bearings 102 and cooperating bearings 104 receive pivot shaft 106 that is journalled in bearings 102. Bearings 104 are secured to tractor plate 83 in the well-known manner.

It is obvious to one skilled in the art that the peripheral locks, in the nature of specially formed dogs 72, will serve to hold plates 20 and 38 in the operative position even when king pin 32 has been rendered inoperative for some reason. These locks are not intended to bear the entire load but are used merely as a supplementary means and for the purpose of holding the parts together until the tractor and trailer can be taken to a service station where king pin 32 may be renewed.

All of the parts illustrated and described should be made of metal having the desired strength, and while one embodiment of the invention has been illustrated and described, it is understood that changes and modifications might be made without departing from the spirit of the invention or the scope of the appended claims.

Having thus described the invention, what is claimed as new and desired to be secured by Letters Patent is:

1. In a fifth wheel assembly for a tractor and a trailer having a trailer plate provided with an annular periphery, a king pin depending from the lower face of the said plate at the axis thereof, a tractor plate having an annular periphery and provided with a radially disposed slot for receiving the king pin and means releasably holding the king pin in the slot on the axis of the trailer plate and tractor plate when the same are in superimposed operative relation, a latching means comprising a plurality of dogs mounted on the tractor plate at the periphery thereof, said dogs extending upwardly for engagement along the annular periphery of said trailer plate and over the upper face thereof when in operative position to preclude radial and axial displacement thereof but permitting relative rotation of the plates; and mechanism on the tractor plate for moving said dogs to and from the operative position, said mechanism having an outwardly extending handle and means for securing the handle and mechanism in the said operative position.

2. In a fifth wheel assembly for a tractor and a trailer, a trailer plate having an annular periphery; a king pin depending from the lower face of the said plate at the axis thereof; a tractor plate having an annular periphery and provided with a radially disposed slot for receiving the king pin; means releasably holding the king pin in the slot on the axis of the trailer plate and tractor plate when the same are in superimposed operative relation; a plurality of dogs mounted on the tractor plate at the periphery thereof, said dogs extending upwardly for engagement along the annular periphery of said trailer plate and over the upper face thereof when in operative position to preclude radial and axial displacement thereof but permitting relative rotation of the plates; and mechanism on the tractor plate for moving said dogs to and from the operative position, certain of said dogs being pivotally mounted on the tractor plate for movement, through the action of gravity, out of the plane of the trailer plate when the dogs are moved out of the operative position.

3. In a fifth wheel assembly for a tractor and a trailer having a trailer plate provided with an annular periphery, a king pin depending from the lower face of the said plate at the axis thereof; a tractor plate having an annular periphery and provided with a radially disposed slot for receiving the king pin and means releasably holding the king pin in the slot on the axis of the trailer plate and tractor plate when the same are in superimposed operative relation, a latching means comprising a plurality of dogs mounted on the tractor plate at the periphery thereof, said dogs extending upwardly for engagement along the annular periphery of said trailer plate and over the upper face thereof when in operative position to preclude radial and axial displacement thereof but permitting relative rotation of the plates; links interconnecting the said dogs; and an operating handle for actuating the links to move the dogs to and from said operative position.

4. In a fifth wheel assembly for a tractor and a trailer, a trailer plate having an annular periphery; a king pin depending from the lower face of the said plate at the axis thereof; a tractor plate having an annular periphery and provided with a radially disposed slot for receiving the king pin; means releasably holding the king pin in the slot on the axis of the trailer plate and tractor plate when the same are in superimposed operative relation; a plurality of dogs mounted on the tractor plate at the periphery thereof, said dogs extending upwardly for engagement along the annular periphery of said trailer plate and over the upper face thereof when in operative position to preclude radial and axial displacement thereof but permitting relative rotation of the plates, said dogs being slidable toward and from the annular periphery of said trailer plate and provided with cam faces and guide elements to direct the dogs upwardly as the same are moved toward the trailer plate and into operative positon with respect thereto.

5. In a fifth wheel assembly for a tractor and a trailer, a trailer plate having an annular periphery; a king pin depending from the trailer plate at the axis thereof, said pin having an annular groove provided therein; a tractor plate provided with a radially disposed slot for receiving the king pin; and means releasably holding the king pin in the slot comprising a pair of jaws pivotally mounted on the tractor plate for movement to and from a position in the annular groove of the king pin, a lock yoke for the jaws slidably carried by the tractor plate adjacent to the said jaws, and common means in connection with the jaws and lock yoke, extending beyond the edge of said tractor plate, for moving the same to and from the operative position with respect to the king pin, said lock yoke being positioned adjacent to the jaws to preclude their accidental withdrawal from the annular groove when the same are in engagement with the king pin.

OTIS A. LOGAN.